United States Patent [19]
Verkade et al.

[11] 3,967,388
[45] July 6, 1976

[54] MECHANICAL SYSTEM FOR VISUALLY DETERMINING PERMITTED ELECTRON DISTRIBUTIONS WITHIN MOLECULES

[75] Inventors: John C. Verkade; Klaus Ruedenberg, both of Ames, Iowa

[73] Assignee: Iowa State University Research Foundation, Inc., Ames, Iowa

[22] Filed: Sept. 25, 1975

[21] Appl. No.: 616,604

Related U.S. Application Data

[63] Continuation-in-part of Ser. No. 470,536, May 16, 1974, abandoned.

[52] U.S. Cl............................................. 35/18 R
[51] Int. Cl.[2]................................... G09B 23/26
[58] Field of Search.............. 35/18 R, 18 A, 28.3, 35/27, 34; 46/16

[56]   References Cited
       UNITED STATES PATENTS

| | | | |
|---|---|---|---|
| 2,949,681 | 8/1960 | Knefeli | 35/34 X |
| 2,970,388 | 2/1961 | Yonkers | 35/18 A |
| 3,080,662 | 3/1963 | Brumlik | 35/18 A |

FOREIGN PATENTS OR APPLICATIONS

460,833   11/1949   Canada................................. 46/16

OTHER PUBLICATIONS

Circular Array, No. 4, Cenco Animated Transparency Teacher Guide, 1965, Rec'd. 1967.
F. L. Carter, J. Appl. Cryst., (1971), 4,86, "Constructing Crystal Models."

*Primary Examiner*—Harland S. Skogquist

[57]   ABSTRACT

The permitted electron distributions within molecules (the molecular orbitals or MO's) are visually determined with mechanical apparatus which employs models of electron distributions within atoms (the atomic orbitals or AO's) as the central generators cooperating with peripheral AO models of the $s$ and $p$ types.

10 Claims, 30 Drawing Figures

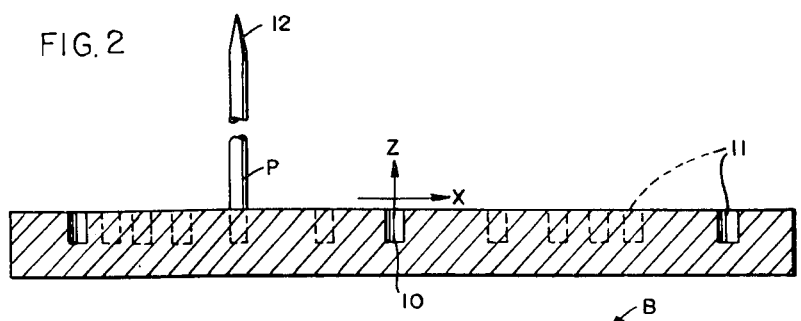
FIG. 2
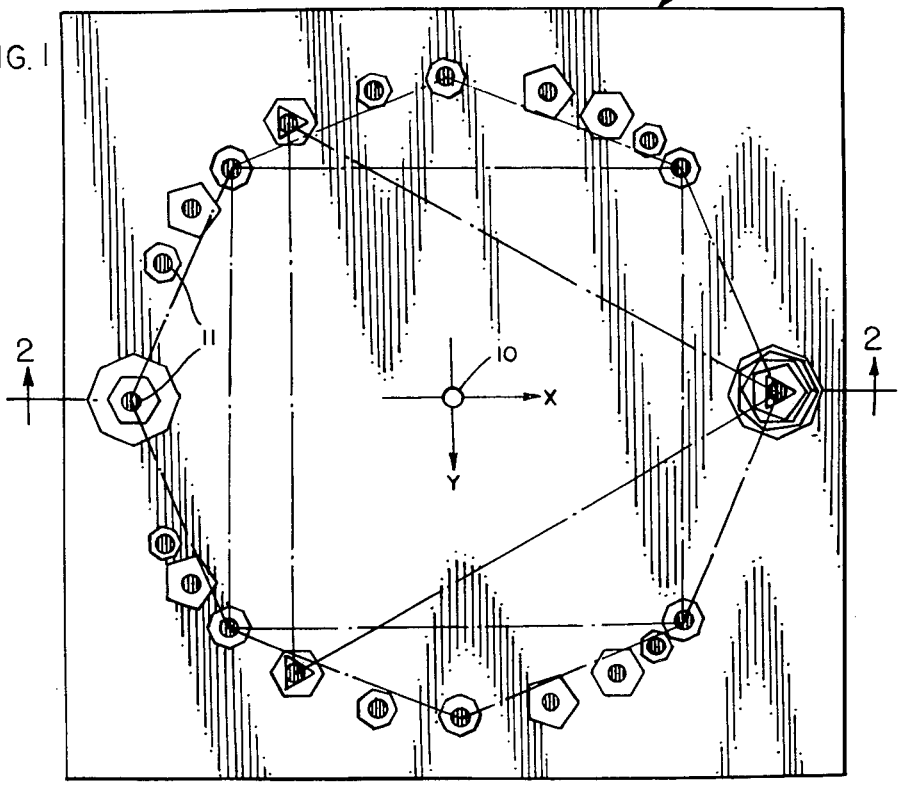
FIG. 1
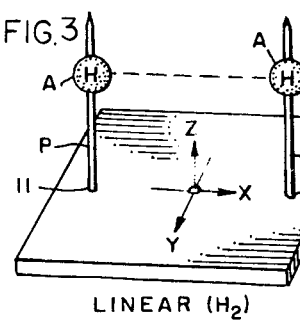
LINEAR ($H_2$)
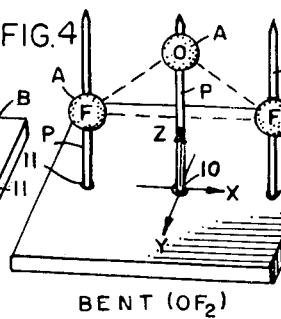
BENT ($OF_2$)
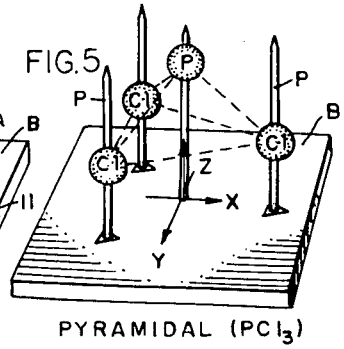
PYRAMIDAL ($PCl_3$)

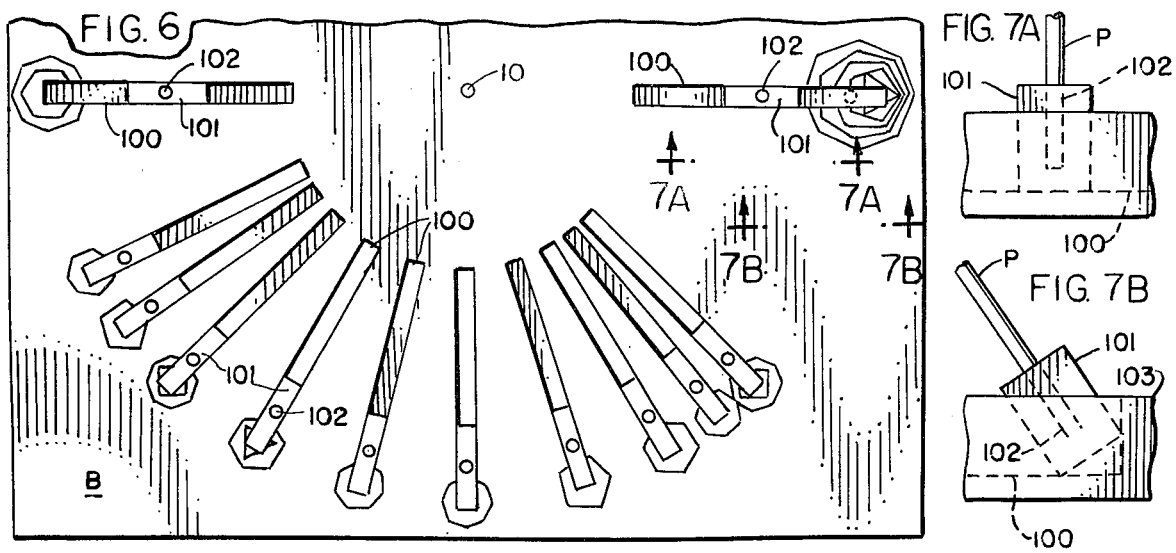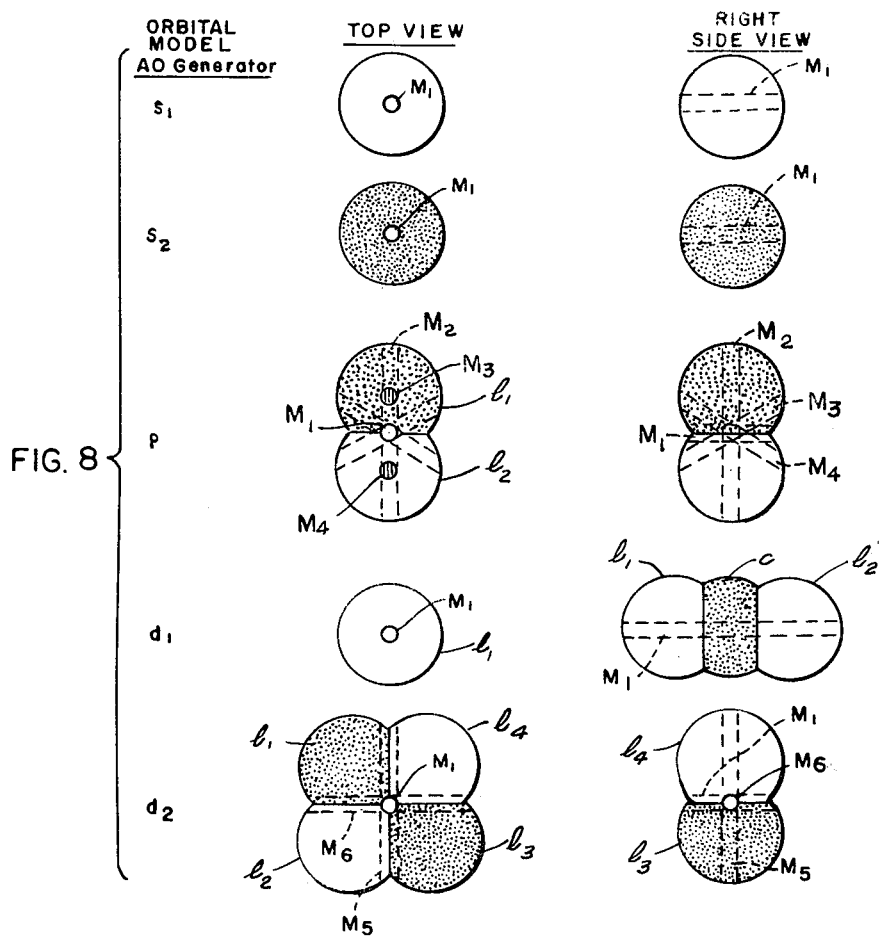

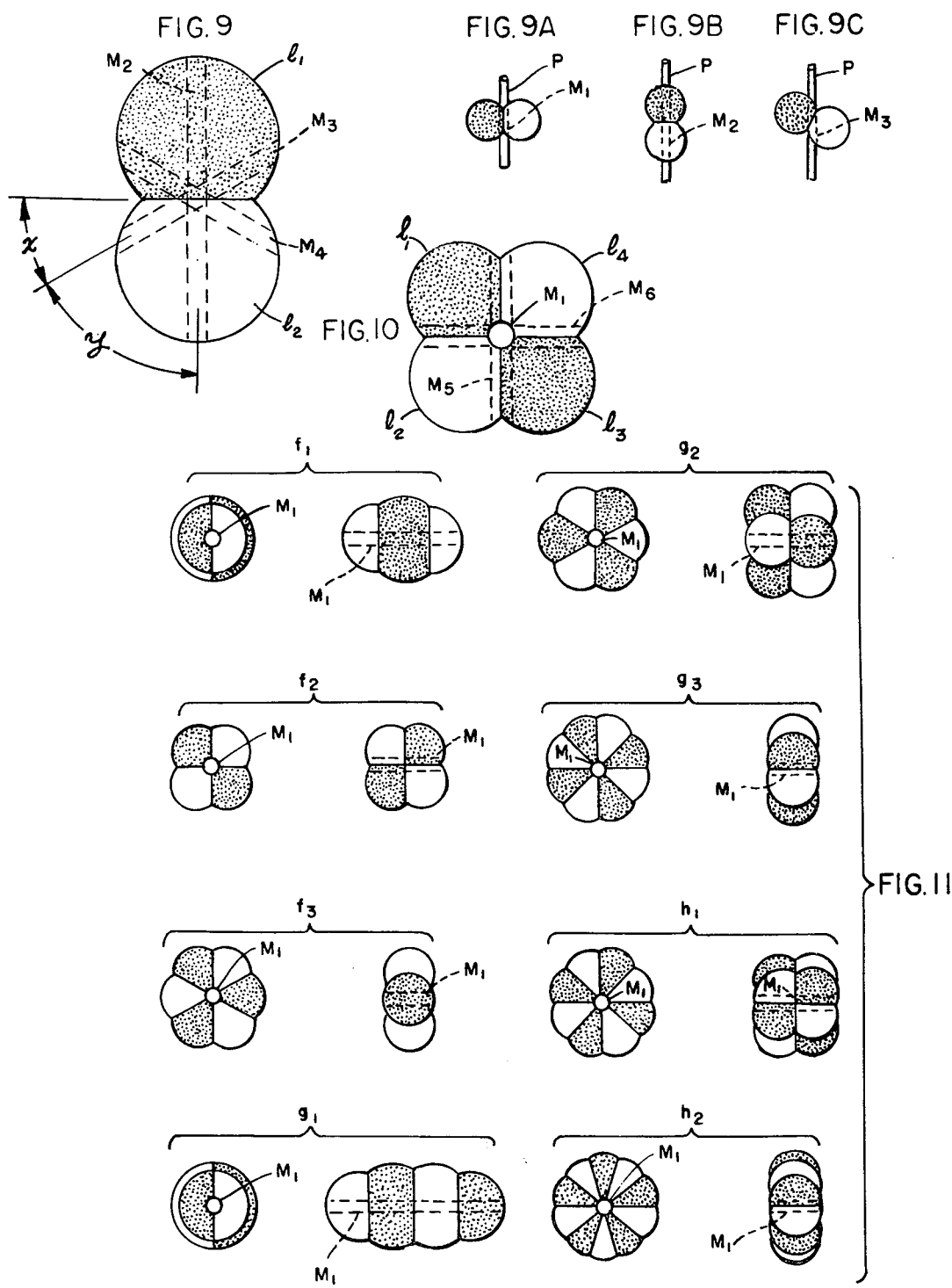

MECHANICAL SYSTEM FOR VISUALLY DETERMINING PERMITTED ELECTRON DISTRIBUTIONS WITHIN MOLECULES

PRIOR APPLICATION

This application is a continuation-in-part of prior application Ser. No. 470,536, filed May 16, 1974, which ws co-pending with this application but is now abandoned.

BACKGROUND AND SUMMARY

Fundamental theoretical calculations of molecular properties, such as their mode of bonding, are based on the following mathematical procedure: Atomic orbitals, i.e., certain spatial distributions of electrons in atoms (hereafter sometimes referred to as "AO's" or an "AO") must be combined to form molecular orbitals, i.e., certain spatial distributions of electrons in molecules (hereafter sometimes referred to as "MO's" or an "MO") according to rigorous and complex mathematical rules derived from the discipline of group theory and pertaining to certain symmetry properties of the AO's and the molecule in question. The present invention furnishes an apparatus that makes it possible to determine the correct AO combinations and to reject all possible incorrect ones visually by mechanical means.

In general, the atomic orbitals of the non-central atoms are of the so-called $s$ and $p$ types. With reference to the valence electrons in the outer electron shells of atoms, there is always one $s$ orbital, and there may also be three $p$ orbitals. As is known, the $s$ type AO's are spherically symmetrical, and therefore are schematically represented as spherical bodies. They may be distinguished as having either a positive or negative wave function, which can be represented by appropriate indicia on the $s$ type AO models.

The $p$ type AO's can be represented as symmetrical bodies having two lobes aligned on a common axis and joined at their inner ends. The lobe portions are most commonly shown as egg-shaped, but they can also be represented as spherical or ellipsoidal. The surface boundaries of the lobe portions of the $p$ type AO's are mathematically defined, but can be represented without such exactitude for model purposes. Each lobe of the $p$ type AO has a different wave sign (positive or negative), and therefore appropriate indicia can be applied to the opposed lobes to indicate the positive or negative nature of the wave functions. The $p$ type AO's are usually arranged in several orientations, with reference to Cartesian axes ($x$, $y$, and $z$), which are also mathematically defined. Commonly used nomenclature is $p_x$, $p_y$, and $p_z$ atomic orbitals.

In the series of atomic orbitals, the next group is referred to as the $d$ AO's. There are five $d$ type AO's, in relation to electron charge distribution and orientation. Four have the same geometric shape, differing only in orientation, and are conventionally represented as symmetrical bodies having four lobes paired on common axes and with their inner end portions joined at a common center. The lobes, as indicated with respect to the $p$ orbitals, may be represented as egg-shaped, ellipsoidal, or spherical. They are more commonly shown as egg-shaped lobes, but the exact shape for model purposes is not important. The adjacent lobes of the $d$ orbitals of the four-lobe type, are of alternate wave sign (positive or negative), the axial pairs being of the same sign. Therefore, appropriate indicia may be applied to such models. With reference to the Cartesian axes ($x$, $y$, $z$) the four-lobed $d$ AO's are commonly designated as $d_{xy}$, $d_{xz}$, $d_{yz}$, and $d_{x^2-y^2}$. The fifth atomic orbital of the $d$ type has a different shape, being referred to as the $d_{z^2}$. It is represented as a two-lobe body, similar to that of the $p$ AO's, the lobes being on a common axis and having their inner ends joined. In addition, however, a torroid is represented as surrounding the inner portions of the lobes. Such representation may be conventionalized, viz. lobe portions connected by a ring portion. The lobe portions have the same wave sign (positive or negative), while the wave sign of the toroid or ring portion is the opposite of the lobe portions. Therefore appropriate indicia indicating the differing wave signs can be applied.

Such model representations, of $s$, $p$, and $d$ type AO's are wellknown to chemists, being described in standard treatises. See, for example, the following:

- H. H. Sisler, "Electronic Structure, Properties, and the Periodic Law", Reinhold Publishing Corp., New York, 1963, Ch. 1, especially pp. 26–27;
- F. A. Cotton and G. Wilkinson, "Advanced Inorganic Chemistry", Second Ed., Interscience Publishers, New York, 1966, Ch. 1, especially p. 17; and
- E. Grunwold, "Chemical Bonding and Structure," Ratheon Education Co., 1968, Ch. 2, especially pp. 16–18.

According to bonding theory, the AO's above the d type, are of negligible importance with respect to peripheral atoms in a molecule, and need only be considered for a central atom when they are present among its valence orbitals. However, the shape of such AO's identified as the $f$, $g$, and $h$ type AO's, are also mathematically determined, and are capable or representation as symmetrical bodies. See, for example:

- H. E. White, "Introduction to Atomic Spectra", McGraw-Hill Book Co., Inc., New York, 1934, Ch. IV, especially p. 63; and
- M. Karplus and R. N. Porter, "Atoms and Molecules", W. A. Benjamin, Inc., 1970, Ch. 3, especially pp. 132–135.

Prior to the present invention, a knowledge of molecular bonding concepts, group theory, quantum mechanics, and related subjects was required to determine the permitted electron distributions within molecules. It was not possible for a chemist or student of chemistry to generate the MO's appropriate for molecular bonding without a firm knowledge and working ability of advanced mathematical concepts and techniques. Further, it is difficult for the non-theoretically oriented person to visualize the various permitted and non-permitted atomic orbital arrangements in three dimensions. Moreover, such visualization is complicated by the fact that with molecules containing more than two atoms, it is possible to envision more atomic orbital arrangements than are permitted from bonding theory: thus, the terminology "permitted" and "non-permitted" AO arrangements. Consequently, there is a practical need for a simple 3-dimensional apparatus that will assist the average chemist or chemistry student in selecting visually by mechanical means the "permitted" arrangements of the AO's of non-central atoms, while at the same time excluding the non-permitted arrangements.

The system of this invention and the apparatus applying it provides the means for such a mechanical selection by introducing models of central atomic orbitals (AO's) as generators for constructing those arrangements of the non-central AO's which represent the permitted molecular orbitals (MO's) of the molecule, the central generators being used in the order of increasing AO complexity: $s$, $p$, $d$, etc. This concept and procedure is believed to be completely novel. In fact, as far as applicants are aware, no prior art apparatus at all is known for determining by mechanical means the permitted and non-permitted molecular orbitals.

The molecular apparatus system of this invention is advantageously provided in the form of a kit, which can be used to generate the permitted molecular orbitals of hundreds of molecules (although, of course, not for all molecules). In accordance with the present invention, an MO can be regarded as an arrangement of valence AO's which are determined by matching the color (or other indicia) characteristics of a "generator AO" at a central point within the molecule (or at the location of a central atom if the molecule has one) with the corresponding characteristics of the AO's at the non-central atom sites. In one embodiment, the opposite color (or other type of contrasting indicia) correspond to opposite signs of the wave functions of the electrons in a given AO or MO. The apparatus of this invention provides an "MO" and "AO" model system kit, which permits visualization by color, or other matching or mismatching relationships. By the novel central generator atomic orbital concept of this invention, it is relatively simple to generate MO's which duplicate the results arrived at by the far more complex group theory. The key generator AO's comprise a series of AO models used in sequence on a central probe. This novel principle, which underlies the method and apparatus of this invention, and its application in generating MO's are illustrated by the accompanying drawings and the following detailed specification.

THE DRAWINGS

In the accompanying drawings, FIG. 1 is a top plan view of an embodiment of a base plate which may be employed in the apparatus of this invention, the base plate being provided with certain holes and markings to assist its use in conjunction with other elements of the apparatus;

FIG. 2 is a side elevational view of the base plate of FIG. 1, taken on line 2—2 thereof, and showing a support pin or rod inserted in one of the holes of the base plate;

FIGS. 3 to 5 illustrate certain common geometrical models of molecules, such as linear (FIG. 3), bent (FIG. 4), and pyramidal (FIG. 5), which will be referred to in discussing the apparatus system of the present invention, but which are not a part thereof;

FIG. 6 is a top plan view of a modified base plate, which may be employed in practicing the present invention;

FIG. 7A is a fragmentary side elevational view of a portion of the base plate of FIG. 6 showing an adjustable means for supporting the pins;

FIG. 7B is a fragmentary side elevational view of the base plate of FIG. 6 showing the adjustable means for supporting the pins in an inclined position;

FIG. 8 illustrates a group of $s$ to $d$ type orbital models which may be used as generator AO's in practicing the present invention;

FIG. 9 is an enlarged side view of the AO generator $p$, illustrating the bore holes therethrough;

FIGS. 9A to 9C, illustrate different inclinations of the $p$ generator AO when applied to a vertically-extending pin;

FIG. 10 is a top view of the generator AO $d_2$, illustrating the bore holes therethrough;

FIG. 11 illustrates additional models, which may be used as generator AO's;

DETAILED DESCRIPTION OF SYSTEM

Figure 12:
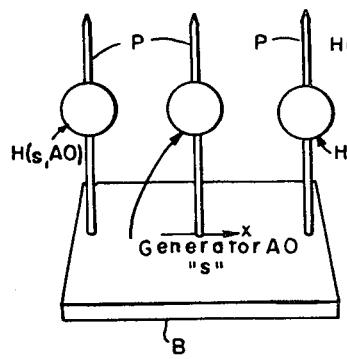
FIGS. 12 and 13 illustrate the use of the apparatus in determining the permitted AO arrangements of the atoms of $H_2$, the molecular model of which is shown in FIG. 3.

Looking first at FIGS. 1 and 2, there is shown a base support member in the form of a base plate. This plate may be formed of wood, metal, or molded of a plastic material. The size need not be large. For example, the dimensions of the base plate may be 6 × 6 × ⅜ inch. The base, designated generally by the letter "B" is provided on its upper surface with a central downwardly-extending opening 10. Arranged generally in a circular ring around opening 10 are provided a plurality of additional holes extending vertically downward from the upper surface of the base plate, these holes being collectively designated by the number 11.

Holes 10 and 11 are designed to supportingly-receive the lower end portions of rods or pins, such as the pin P of FIG. 2, and to support them in vertical parallel alignment. As will be appreciated, other means may be provided for mounting the pins P in a vertically-aligned orientation at designated points on the surface of base B. However, the arrangement shown is convenient. In a specific embodiment the holes 10 can be formed with a depth of approximately ¼ inch, and with a diameter slightly larger than the external diameter of the pins P to frictionally-receive the lower ends of the pins. The pins may be formed of wood, metal, or plastics. A diameter of 3/16 inch and a length of 8 to 9 inches is convenient. The upper ends of the rods P can be pointed, as indicated at 12 in FIG. 2, to facilitate application of the atomic models, AO's and generator AO's.

As indicated in FIGS. 1 and 2, the central opening 10 and the rod P received therein may be regarded as defining the intersection of right angle coordinates $x$, $y$, and $z$. The opening 10, which may be indicated by the bore 10 itself, and/or by other markings, such as the crossed arrow lines, indicating the axes $x$ and $y$, thereby defining the central position and central axis of the molecules. In use, the base B extends horizontally, the axes $x$ and $y$ lying in a horizontal plane, and the axis $z$ (defined by the central pin P) extending vertically.

The top surface of plate B also provides a plurality of defined peripheral positions arranged generally in a ring around the central position 10. These comprise the holes 11 and the markings associated therewith, which are arranged to include sets of positions representing the corners of plane geometric figures. For example, such geometric figures will include at least a straight line, an equilateral triangle, and a square, and may include other regular geometric figures, such as a pentagon, a hexagon, and an octagon. As shown in FIG. 1, the set of holes to be used for each of these geometric figures is indicated by a corresponding symbol, such as Δ for a triangle, □ for a square, etc. and similarly for further regular polygons.

As an aid to understanding the relation of the system of the present invention to prior art models of molecular geometries, FIGS. 3 to 5 illustrate conventional models of three molecules. In FIG. 3, there is shown the linear molecule $H_2$, the atoms A being supported on pins P mounted in holes 11 of base B. The axial orientation, x, y, and z is also shown. FIG. 4 employs a similar molecular model, illustrating the bent molecule $OF_2$, the components of the model being similarly identified, the outer pins P being inserted in the holes 11, and the central pin P being inserted in the hole 10. FIG. 5 illustrates a molecular model of a somewhat more complicated molecule, the pyramidal molecule $PCl_3$. While such conventional molecular models could be constructed from the apparatus components used in practicing the system of the present invention, this is not the objective of the present invention, and FIGS. 3 to 5 are included primarily to illustrate the difference between conventional molecular model apparatus, and the apparatus system of the present invention. Also, it will be convenient to refer to FIGS. 3 to 5 in conjunction with certain of the examples describing the operation of the MO determining system and apparatus of the present invention. Example I relates to the determination of the permitted MO's of the linear molecule $H_2$, whose model is shown in FIG. 3, but it will readily be apparent from an examination of FIGS. 12 to 13, that there is little resemblance between the molecular model per se, and the apparatus system of the present invention for determining permitted molecular orbitals. A similar comparison may be made between Example II ($OF_2$) and FIG. 4, as well as between Example IV ($PCl_3$) and FIG. 5, having reference to the figures illustrating the determination of those combinations of AO's that are permitted for MO formation in the respective molecules.

Orbital representations, in the form of bodies, comprising a sequenced group of AO generators, are illustrated by FIG. 8. In general, the representations can be described as 3-dimensional bodies of symmetrical shape. Each of the orbital models (AO generators) are identified by specific letter designatons, namely $s_1, s_2, p, d_1$ and $d_2$. Top and right side views are shown for each model. Because of the symmetrical nature of the models, it will be understood that the bottom views and left side views will correspond to the views shown, except that the contrasting shadings or markings of certain portions of the models may be reversed as between the top view and bottom view, and/or between the right side view and left side view. Where such reversal occurs, it is apparent from an examination of the views shown.

All of the model bodies of FIG. 8 are provided with a vertically-extending bore passing completely therethrough, and designated as mounting holes $M_1$. The holes $M_1$ permit the bodies to be mounted on the vertically-extending rods or pins P, and particularly on the central pin P which is received in base hole 10. For example, in FIGS. 3 to 5, bodies corresponding to $s_1$ are shown as being slidably-received on the mounting pins P. Preferably, the pins P and models $s_1$ to $d_2$ are formed so that the exterior surfaces of the pins P will frictionally engage the cores $M_1$, or other bores therethrough. The bores should be adjustable to a selected height thereon, while at the same time the bores $M_1$ should have sufficient frictional engagement with the pins to support the models at the selected heights. In practice, it has been found that when the pins are formed of wood, and the models of polystyrene foam that such slidable frictional engagement is readily obtainable if the holes are lined with silicone rubber. However, other materials of construction can be used for the pins and models, including wood, metal, and plastics.

As indicated in FIG. 8 and shown more clearly in FIGS. 9 and 10, the model bodies $p$ and $d_2$ are provided with additional bores, which are also designed for slidable frictional engagement with the pins P. With respect to model $p$, as shown in FIG. 9, a transverse bore $M_2$ is provided and also two diagonal bores $M_3$ and $M_4$. All of the bores $M_2$, $M_3$ and $M_4$ are in the same general plane which intersects bore $M_1$ at its midpoint. The bores $M_1$ and $M_2$ intersect each other at right angles, and the bores $M_3$ and $M_4$ are at acute angles with respect to the axes of bores $M_1$ and $M_2$. As shown in FIG. 9, the inclination of the bores $M_3$ and $M_4$ is at a relatively small acute angle with respect to the axis of bore $M_1$, while being at a larger acute angle with respect to the bore $M_2$. For example, the angle $x$ may comprise from 20° to 30°, or 15° to 25°, while the angle $y$ may comprise from 60° to 70°, or 65° to 75°. For example, the angle $x$ can be 25° and the angle $y$ 65°. Advatageously, the angle $x$ can be 19° and the angle $y$ 71°.

In FIGS. 9A, 9B, and 9C, several orientations of the $p$ AO generator body are illustrated. In FIG. 9A, the pin P extends through the bore $M_1$, while in FIG. 9B the pin extends through the bore $M_2$. In FIG. 9C, the pin P extends through the bore $M_3$.

The model body $d_2$, as shown in FIG. 10, is also provided with two transverse bores $M_5$ and $M_6$, the bores being dimensioned as previously described for frictional sliding engagement with the pins P. The bores $M_5$ and $M_6$ lie generally in the same plane, and intersect the bore $M_1$ at its midpoint. The permitted orientations of the model body $d_2$ on the pins P will be apparent. If desired, one of the transverse bores $M_5$ or $M_6$ can be omitted, since the same relative position of this model body can be achieved by rotating it on the pin received in either bore $M_5$ or $M_6$.

As will be noted from an examination of FIG. 8, the model body $s_2$ is stippled to indicate a contrasting color, and the other models also have alternating stippled portions to indicate contrasting colors, markings, or other contrasting indicia. As will be subsequently illustrated in greater detail, these contrasting markings, are used to apply the novel principle of color (indicia) matching in generating the permitted atomic orbital (AO arrangements of the non-central atoms, as well as in arranging the AO's of the central atom, when there is one, in proper relation to the peripheral AO arrangements.

The stippled models (e.g., $s_2$) or stippled portions of the other models are not intended to indicate any specific colors, but rather contrasting colors or other contrasting marking indicia. Conveniently, however, the stippled models or portions may be made black, and the other models or portions thereof, white, or other contrasting colors can be used.

It should be understood that the principle of color or indicia reversal also applies, that is, it is immaterial for the purpose of the use of the AO models whether $s_1$ is white as shown, and $s_2$ is black as shown, or whether these colors are reversed. Similarly, the light and dark portions of model bodies $p$, $d$, and $d_2$ can be reversed.

The AO bodies $s_1$ and $s_2$ are spherical. Their diameter will depend on the size of the model unit to be constructed, but for practical purposes, diameters of from 0.5 to 2 inches, such as a diameter of about 1 inch are preferred. The size of the other model bodies can then be made to correspond, the relative proportions being as indicated in the drawing.

The symmetrical model body $p$ includes two identically-shaped (mirror image) lobe portions $l_1$ and $l_2$ axially-aligned and joined together at their contacting central portions. The lobes may be generally spherical, egg-shaped, or ellipsoidal, etc., providing they are symmetrical (i.e., mirror images with respect to each other in a particular representation). The exact surface curvature is not critical for the system of this invention. The width of the area of joinder is preferably sufficient to provide space for the inclusion of the bore $M_1$, and the inclined bores $M_3$ and $M_4$. If desired, a greater overlap between the lobe portions can be provided, the lobes, for example, then being portions of spheres. The exact shape of the outer surfaces of the lobes of the $p$ type AO's is not critical for use in the MO determining system, and will not affect the use of the $p$ AO models in determining particular molecular orbitals.

It should also be understood that instead of one $p$ type body, four $p$ bodies could be used, each having only one of the bores. However, for purpose of compactness and convenience of use, it is preferred to provide each of the $p$ bodies with a vertical bore, a transverse bore and two inclined bores, as shown and described. By the use of $p$ type model bodies, either as one body with four passages or as four bodies with individual passages, there can be determined all the MO's that can be generated with a $p$ type AO generator.

Referring now to the symmetrical model body $d_1$, it consists of two mirror image outer lobe portions $l_1$ and $l_2$ and a central portion $c$. As shown, the lobes are sections of spheres and central portion $c$ is a torus. As explained with respect to the $p$ model, however, the exact configuration of the outer surfaces of the body does not affect the use of the body in the apparatus of the present invention. For example, the lobes can be larger or smaller sections of spheres, or can be ellipsoidal or egg-shaped. The central portion can also vary in annular shape, such as being a section of a sphere, an ellipsoid, or a cylinder.

The symmetrical model body $d_2$ includes four connected lobes $l_1$, $l_1$, $l_3$, and $l_4$, arranged in a clover leaf configuration. The lobes are preferably identically shaped. As shown, the lobes are sections joined along planes intersecting the central bores $M_1$, $M_5$, and $M_6$. The area of joinder is preferably sufficient to permit the bores to be accomodated therein. It will be understood from what has been previously said, however, that the spherical portions can be more elongated, that is, more egg-shaped or ellipsoidal. Further, if desired three separate $d_2$ model bodies can be provided each having only one of the bores $M_1$, $M_5$, and $M_6$.

The contrasting indicia, such as color, as represented by the white and stippled portions of the model bodies of FIG. 8, has previously been explained. The lobes $l_1$ and $l_2$ of the $p$ model body bear contrasting indicia. With respect to the model body $d_1$, the outer lobes bear the same indicia, while the central annular portion bears a contrasting. In the model body $d_2$ the opposed axially-lobes ($l_1$–$l_3$, $l_2$–$l_4$) bear the same indicia.

OPERATION OF APPARATUS

In utilizing the AO bodies in the system of the present invention, certain rules apply. These general rules will be apparent to those having knowledge of molecular configurations. For example, with respect to non-central atoms, that is, the peripheral atoms in a molecule, only the $s_1$, $s_2$, or $p$ models are used. In peripheral positions on pins P, the models represent valence state AO's of the non-central atoms. This is known per se from valence electron theory. The general molecular shape is also known, and will determine the location of the peripheral pins P. For example, the particular molecule may require a linear arrangement, a triangular arrangement, a square arrangement, etc., of the pins P, the appropriate designated holes being selected to achieve this general molecular shape with respect to the peripheral atoms.

The molecular orbitals (MO's) are arrangements of valence atomic orbitals (AO's) dictated by the symmetry (i.e., color arrangement) of the generator AO's at a central point within the molecule, or at the location of a central atom if the molecule has one. More specifically, the AO's $s_1$ to $d_2$ are used on the central pin P (received in the hole 10) as the means for generating the permitted AO arrangements of the non-central atoms. These generator AO's are used in the sequence $s_1$, $s_2$, etc. until the total number of permitted AO arrangements of the non-central atoms having been generated. In general, there are as many MO's as there are AO's used. Where the molecule contains only non-central atoms, there will be the same number of permitted arrangements of the atomic orbitals as there are non-central atom AO's employed. In such a molecule, each permitted MO is obtained by using the principle of indicia matching between the lobes of the central generator AO and the lobes of the peripheral AO's. The peripheral atoms are bound to one another by those permitted AO arrangements which involve a greater number of color matched AO's on adjacent peripheral atoms than color mis-matched ones. Such AO arrangements are called "bonding MO's", as is well-known from bonding theory. Those permitted AO arrangements which contain more adjacent color mis-matched AO's than color matched ones are called "anti-bonding MO's" while those in which the adjacent color mis-matched and matched AO's are equal in number are called "non-bonding MO's". Where the molecule includes a central atom, however, the peripheral atoms are bound exclusively to the central atom. Thus each valence AO on the central atom color matches with one of the permitted peripheral AO arrangements. In order to preserve the rule that the total number of permitted MO's equals the total number of AO's used, it is a necessary consequence of bonding theory that the color mis-matched combination of any given central atom valence AO with its peripheral atom AO arrangement is also permitted. Thus for each central atom AO so employed, a bonding (color matched) and an anti-bonding (totally mis-matched) MO will be produced. Often it will occur that permitted peripheral AO arrangements are unable to color match or mis-match with a central AO because of the absence of such an AO in the valence shell of the central atom. Such a peripheral AO arrangement is a non-bonding MO. It is known from bonding theory that molecules are held together by electron occupation of molecular orbitals. In general then, molecules can exist only when the number of electron-occupied bonding MO's exceeds the number of electron-occupied anti-bonding MO's since occupied anti-bonding MO's essentially cancel their bonding counterparts. Depending on the molecule, non-bonding MO's may or may not be entirely absent. The matching of colors among two or more AO's in a permitted AO arrangement thus expresses the quantum mechanical concept of bonding of two nuclei, provided electron density is present in the MO. The mis-matching of colors among two or more AO's in a permitted AO arrangement expresses the quantum mechanical concept of electronically repelling two or more nuclei from one another, provided electron density is present in such an anti-bonding MO.

In general, therefore, the permitted arrangements of the $s$ and $p$ orbitals of the non-central atom locations are generated by employing in sequence the generator AO's $s_1$, $s_2$, $p$, etc. on the central point of the molecule, whether or not it includes a central atom. For example, the chemist or chemistry student begins with the $s_1$ orbital on the central rod, and progresses through the series of FIG. 8, as far as is necessary. All of the MO's for many simple molecules can be generated by using only the models $s_1$, $s_2$ and p of FIG. 8, and additional ones by using the $d_1$ and $d_2$ AO's. The height of the central AO generator is determined visually by the general geometry of the molecule. For example, if the molecule contains a central atom which is in the same plane as the peripheral atoms in the horizontal plane, or if there is no atom at the central location, the generator AO is located at the same height as the peripheral atoms in a generally horizontal plane. If the central atom is above the plane, the generator orbital can be raised to a height appropriate to the known or predicted bond angles in the molecule. These angles can be visually approximated by the operator, or if necessary with the use of a protractor. The generation of the permitted arrangements of the peripheral AO's thus arises from the color matching which occurs when an appropriate central generator AO is used.

Atomic orbitals beyond the $d$ type AO's, such as the $f$, $g$, and $h$, types, are considerably more complicated. However, they are also capable of representation in a manner similar to those of FIG. 8. Such representations are shown in FIG. 11, each of the model bodies being shown with a top view on the left and a right side view on the right hand side. These consist of the bodies $f_1$, $f_2$, $f_3$, $g_1$, $g_2$, $g_3$, $h_1$, and $h_2$. The sections of the bodies have contrasting indicia, as shown, and are each provided with a mounting bore $M_1$. It should be understood that the inclusion of the model bodies of FIG. 11 in a kit apparatus is optional. But such kits should include at least the $s$ and $p$ type AO's, and preferably, also, th $d$ type AO's.

The procedure is illustrated in greater detail by the following specific examples.

EXAMPLE I (Hydrogen, $H_2$)

Figure 13:
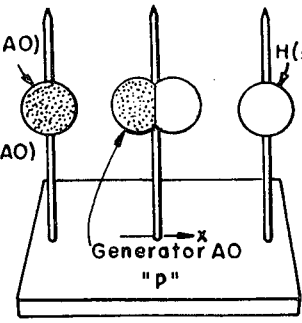

The $H_2$ molecule contains two atoms, each of which has one valence $s$ atomic orbital (AO) to use in molecular orbital (MO) formation. (The molecular model is shown in FIG. 3.) Since there are as many MO's as AO's used, and there is one AO for each H, there are two permitted MO's. To determine these, use first the $s_1$ generator model body (AO) at the center (FIG. 12). The matching color rule indicates that both hydrogen atomic $s$ orbitals must be white. (All black orbitals could be used as well.) Since the generator model body $s_1$ at the center is only a tool and is not part of the hydrogen molecule, it is now removed and another model in the generator AO series is used to generate the second MO. The other permitted arrangement is determined by trying a $p$ generator. There are three possible orientations of the $p$ model: one pointing along each of the Cartesian coordinate directions $x$, $y$, and $z$. But only the generator AO orientation shown in FIG. 13 (along coordinate $x$) results in the possibility of a net color match. The other two (aligned along coordinates $y$ and $z$) yield no overall color match because of "cancellation" of any attempted white-white match by a black-white mis-match. Reversing all the colors in FIG. 13 yields the same relative arrangement of colors and it therefore is the same MO. Removing th $p$ generator body leaves the second possible MO, and the desired visual demonstration has been achieved. The two permitted MO's are those shown in FIGS. 12 and 13 (with it being understood that the $s_1$ and $p$ body generators are removed or ignored). The MO in FIG. 12 is a bonding MO (color matched) while that in FIG. 13 is anti-bonding (color mismatched).

EXAMPLE II (Oxygen Difluoride, $OF_2$)

Figure 14:
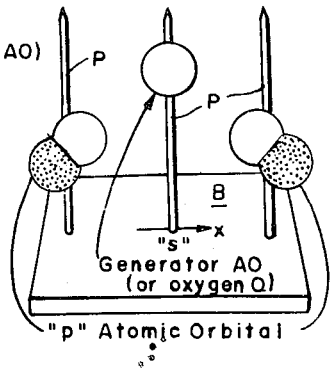
FIGS. 14 to 17 illustrate the application of the apparatus to the determination of the permitted AO arrangements of the F atoms of $OF_2$ and the MO's of the $OF_2$ molecule, the molecular model of which is shown in FIG. 4.
Figure 15:
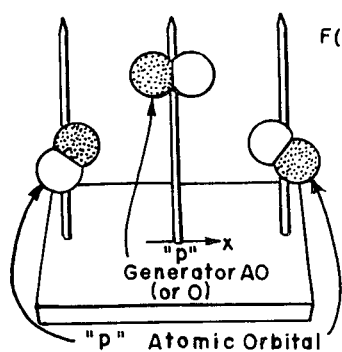

Oxygen difluoride ($OF_2$) has a bent shape with the oxygen at the "corner". (The molecular model is shown in FIG. 4.) To determine the two permissible AO arrangements of the two fluorine "valence $p$" orbitals directed toward the oxygen, the generator AO's bodies are used in sequence at the oxygen position, the oxygen central atom being temporarily disregarded. The permitted $p$ AO arrangements of the F atoms are found to be generated by an $s_1$ and $p$ generator orbitals when arranged as shown in FIGS. 14 and 15, respectively. One of the two $p$ generator orbital positions ($y$ axis alignment) results in no net color matching because of color cancellation, similar to that encountered with $H_2$ in Example I. The other possible $p$ generator AO position ($z$ axis alignment) gives the same fluorine $p$ arrangement as did the $s_1$ generator as shown in FIG. 14. (As previously pointed out color reversals in a given arrangement make no difference, so the same result could have been achieved with an $s_2$ generator). The two permitted peripheral AO arrangements are therefore shown in FIGS. 14 and 15.

Figure 16:
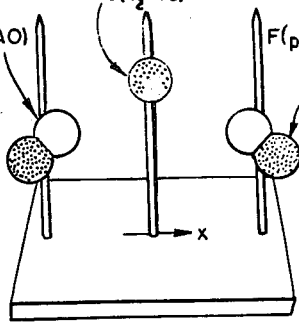
Figure 17:
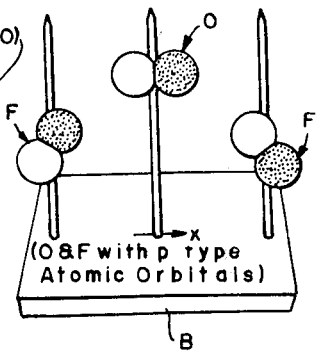

Unlike $H_2$ which had no central atom, $OF_2$ does have an oxygen at that position. Oxygen possesses valence AO's of its own (both $s$ and $p$ types) which can color-match with the two permitted fluorine AO arrangements, causing bonding by allowing the AO's on all the atoms to contribute to MO formation. Consequently, to complete the molecular model, the artificial generator AO's must be replaced by valence AO's on the oxygen. When this is done, color matching is achieved with an oxygen valence $s_1$ and one of the valence $p$ AO's arranged as previously shown in FIG. 14. Here the $s_1$ generator is now regarded as an oxygen (0) AO. Similarly, when the 0 AO is of the $p$ type, the molecular arrangement is as shown in FIG. 15. In each case, as will be noted, an oxygen AO is combined with a fluorine $p$ orbital arrangement. Moreover, on bonding principles it is known that for each totally color matched combination of FIGS. 14 and 15 (bonding MO's) there exists the totally mismatched combination (anti-bonding MO) as shown in FIGS. 16 and 17. Thus there are four permissible MO's as shown in FIGS. 14 to 17 since there were a total of four AO's used (one $p$ on each fluorine, an $s$ on oxygen, and a $p$ on oxygen).

The choice of the proper valence AO's on the peripheral atoms ($p$ rather than $s$ in this case) is not entirely arbitary. The choice is dictated primarily by the energies of peripheral orbitals relative to those of the central atoms AO's and the degree of orbital inter-penetration which can be realized. If the AO energies are similar and their overlap is high in a given permitted MO, better MO's are formed. Since these concepts are embodied in bonding theory, the choice of orbitals can be made rather easily by a user having a basic knowledge of bonding theory.

EXAMPLE III (Nitrogen, $N_2$)

Figure 18:
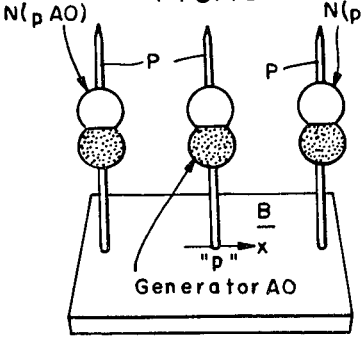
FIGS. 18 and 19 illustrate the application of the apparatus to determining some of the permitted AO arrangements for the atoms of $N_2$.
Figure 19:
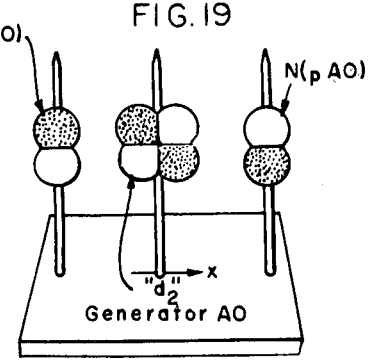

Nitrogen ($N_2$) requires the use of additional generator model bodies in the $s$ to $d$ series of FIG. 8, since $pi$ MO's must be generated. Examples I and II utilized the so-called "sigma" type MO's, in which the AO's point more-or-less directly at each other. In addition to sigma orbitals, nitrogen also possesses $pi$ orbitals and these will be treated in the present example. Each nitrogen atom is known to have a $p$ AO pointed along the $z$ direction, as shown in FIG. 18. An $s_1$ or $s_2$ generator body AO between these nitrogen $p$ orbitals yields no net color matching. Using a $p$ generator arranged as shown in FIG. 18, a net color match is achieved, but not in the other two possible orientations of the $p$ generator AO. Still another MO is required since a total of two nitrogen $p$ orbitals are involved. No color match is possible with the $d_1$ generator but with the $d_2$ generator the second permissible arrangement is achieved as shown in FIG. 19. The MO's illustrated by FIGS. 18 and 19 for $N_2$ (assuming the generator AO's are removed) are designated as a $pi$ bonding and $pi$ anti-bonding MO, respectively. There is an exactly equivalent set of $pi$ MO's formed from the nitrogen $p$ orbitals pointing along the $y$ direction.

Examples I and II demonstrated that in molecules without a central atom (e.g., $H_2$ or $N_2$), the permitted AO arrangements become the permitted MO's. In molecules possessing a central atom (e.g., $OF_2$), the permitted AO arrangements on the peripheral atoms combine in two ways with a given orbital on the central atom: one way involves color matching to form a bonding MO as in $OF_2$ of Example II and the other involves color mis-matching to form the anti-bonding MO. Furthermore, in some molecules with a central atom there will be AO arrangements generated by orbitals of the types $p$, $d$, etc. which may not be available in the valence shell of the central atom. These AO arrangements become the non-bonding MO's of the molecule, and require use of the generator model $p$, $d_1$, $d_2$ (FIG. 8), or sometimes the model bodies of FIG. 11.

EXAMPLE IV (Phosphorus Trichloride, $PCl_3$)

Having considered the foregoing examples, the use of the apparatus can now be readily applied to a more complicated case. For example, phosphorus trichloride ($PCl_3$) is known to have a generally pyramidal shape with the phosphorus atom at the apex, as represented in FIG. 5. To determine the three permissible AO arrangements of the three chlorine $p$ orbitals directed toward the phosphorus, the generator AO's are used at the central atom position (phosphorus) in the manner previously described. The three AO arrangements are shown in FIGS. 20–22, wherein the central phosphorus AO's are imagined to be generator AO's.

Figure 20:
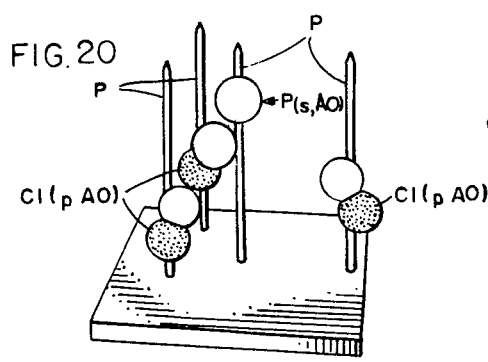
FIGS. 20 to 26 illustrate the application of the apparatus to determining the permitted AO arrangements and MO's for the atoms of $PCl_3$, the molecular model of which is shown in FIG. 5.
Figure 21:
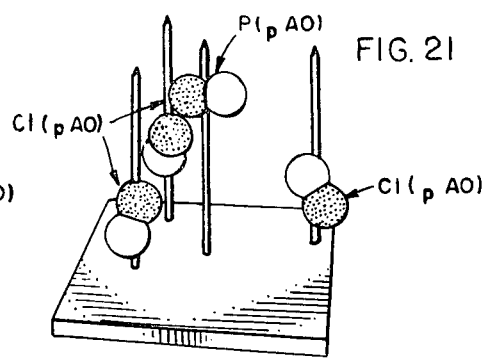
Figure 22:
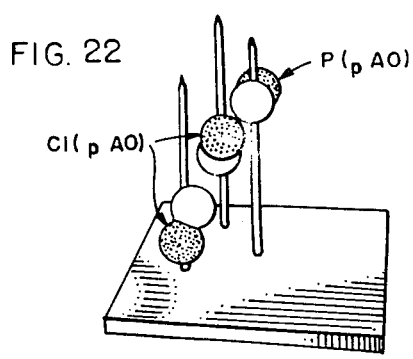
Figure 23:
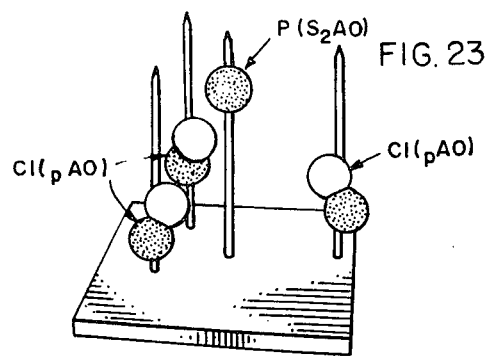
Figure 24:
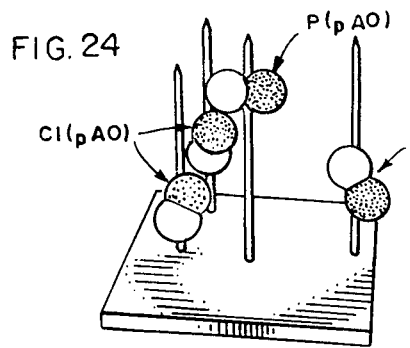
Figure 25:
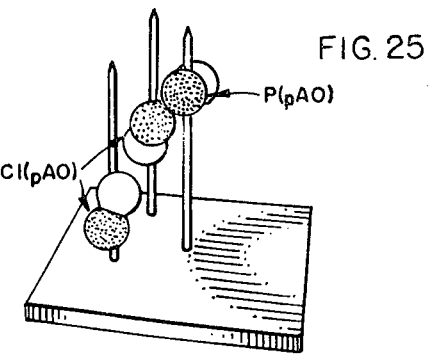

As in $OF_2$, the central atom in $PCl_3$ has AO's with which it can color match the chlorine orbital arrangements and these are shown in FIG. 20–22. Just as in $OF_2$ (Example II), the color matched combinations of the permitted Cl AO arrangements in $PCl_3$ with the phosphorus AO's (i.e., the MO's shown in FIGS. 20–22) have color mis-matched counterparts, as shown in FIGS. 23–25, which are also MO's and their sum is six as in agreement with the sum of the three AO's on chlorine and three AO's on phosphorus (an $s$ and two $p$'s).

Figure 26:
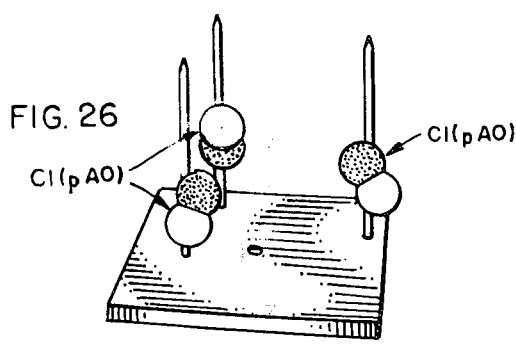

The efficacy of the generator AO approach to visualization of the permitted peripheral AO arrangements is clearly demonstrable in this example. It is possible to postulate another arrangement of the peripheral chlorine AO's namely that shown in FIG. 26, which is different from those shown in FIGS. 20–25. This new arrangement is group-theoretically forbidden, however, and indeed none of the generator AO's will produce this arrangement.

EXAMPLE OF APPARATUS KIT

While a very simple apparatus kit constructed in accordance with the present invention, can include only the $s_1$, $s_2$ and $p$ AO's, it will be preferable to include at least the following numbers of the AO generator bodies in a commercial kit for general use by college students taking a first course in chemistry.

| Orbital Model AO Generator | Number Provided for Kit |
|---|---|
| $s_1$ | 17 |
| $s_2$ | 8 |
| $p$ | 17 |
| $d_1$ | 1 |
| $d_2$ | 1 |

If the generator model bodies of FIG. 11 are also included, it will only be necessary to include one of each, such as one $f_1$ body, etc. These bodies are only used one at a time on the central generator, as are the bodies $d_1$ and $d_2$.

MODIFICATION

In actual molecules the atomic orbitals overlap. However, in providing a model apparatus, it is not practical to make the atomic orbitals overlap, but, if desired, the position of the bodies can be made adjustable. The bodies can then be positioned in closer proximity, and even touching, where practical. This can improve the visual impression of the model as used for the molecular orbitals. With the form of the model kit previously described, vertical adjustments of AO's model bodies can easily be made on the pins P. However, no provision is made for horizontal adjustment. Such horizontal adjustment can be achieved by the modification of FIG. 6. Instead of the holes 11 in the base, a plurality of radially extending slots 100 are provided, the slots extending from the geometrical indicia at their outer ends part of the way toward the central opening 10, as shown. Within the slots 100 (See FIG. 7A), there are provided rectilinear blocks 101, which are dimensioned to permit sliding within the slots 100, while being snugly received therein for secure frictional engagement, when seated in a selected position. The blocks are provided with vertically extending bores 102 which receive the pins P. Thus, the pins and the AO's models mounted thereon can be moved inwardly or outwardly. In FIG. 6, the blocks 101 are shown in midposition within the slots 100, as they might be used for generating the permitted molecular orbitals of molecules, such as those illustrated in FIGS. 3 and 4.

The modification of FIG. 6 can also be used for another purpose, as illustrated in FIG. 7B. The blocks 101 can be tilted in the slots 100 to permit the pins P to assume an inclined orientaton. As shown in FIG. 7B, the upper corner of the inclined block 101 is resting against the side of the outer end wall 103 of the slot 100. This position can provide a selected angle of inclination, such as the angle $x$ or the angle $y$, as described in connection with the bore passages of the $p$ type model. For example, as shown, the pin P can be used to support a $p$ type body at a selected inclination, such as used in FIG. 14 to 17. For this purpose, the bores $M_2$ will be used with the pins P. If desired, therefore, with the modification of FIG. 6, one or both of the inclined passages $M_3$ or $M_4$ can be omitted. However, to facilitate flexibility of use, it is preferred to provide the $p$ type AO bodies with all of the bores illustrated in FIG. 9, even though inclination of the pins P is provided for, as described above, or by other means.

We claim:

1. An apparatus system for determining mechanically those combinations of AO's that are permitted for MO formation in a given molecule, comprising:
   a. horizontally-extending base means providing on the upper surface thereof a central position and a plurality of peripheral positions arranged generally in a ring around said central position, said peripheral positions including sets of positions representing the corners of plane geometric figures including at least a straight line, an equilateral triangle, and a square;
   b. pin means supportable at said central position to extend vertically upward therefrom for defining a generator axis;
   c. a plurality of movable pin means selectively positionable on said base means at selected ones of said peripheral positions comprising the corners of one of said geometric figures corresponding to the general shape of the molecule for which the MO's are to be determined and extending upwardly from said base means around said central pin means;
   d. means for temporarily mounting said movable pin means at said selected positions;
   e. a plurality of atomic orbital models (AO's) capable of representing $s$ and $p$ types of AO's, said AO models comprising bodies removably mountable on said peripheral pins at selected heights and orientations thereon; and
   f. a plurality of generator models including models capable of representing said $s$ and $p$ types of AO's, said generator models comprising bodies removably mountable on said central pin means at selected heights and orientations thereon; said $s$ type bodies for use on both said central and peripheral pin means being of generally spherical shape and including ones with one kind of matchable indicia and others with a different kind of matchable indicia, said $p$ type bodies being symmetrical and having two axially-aligned lobes, one lobe of each $p$ type body being provided with said first kind of matchable indicia and the other lobe with said other kind of matchable indicia, whereby sequented substitutions of the different AO bodies on said central pin means matching and mis-matching alignments thereof with said AO bodies on said peripheral pin means will select those permitted arrangements of the AO's which form the MO's for a wide variety of molecules.

2. The apparatus system of claim 1 in which said model bodies for mounting on said central pin means also include models capable of representing $d$ type AO's, the $d$ type model bodies being of two kinds, one kind being a symmetrical body having axially-aligned outer lobe portions and an intermediate annular portion, said lobe portions being provided with said first kind of matchable indicia and said annular portions being provided with said other kind of matchable indicia, the other kind of said $d$ type AO being a symmetrical body having four lobe portions with pairs of said lobes aligned on axes extending through the center of said body, one of said pairs being provided with said first kind of matchable indicia and the other pair being provided with said other kind of said matchable indicia.

3. The apparatus system of claim 1 in which said peripheral and central model bodies are provided with bores extending therethrough and slidably receivable on said peripheral and central pin means, the walls of said bores having sufficient frictional engagement with the outside surfaces of said pin means to frictionally support said model means thereon at said selected heights and orientations.

4. The apparatus system of claim 1 in which said temporary mounting means for said peripheral pin means comprise vertically-extending holes in said base means at said peripheral positions, said peripheral pin means having lower end portions supportingly insertable in said holes.

5. The apparatus system of claim 1 in which at least some of said peripheral positions have geometric indicia associated therewith to indicate at least the respective positions comprising the sets for said equilateral triangle and said square.

6. The apparatus system of claim 1 in which said $p$ type AO model bodies are provided with a plurality of bores for mounting said bodies in different selected orientations on said central and peripheral pin means.

7. The apparatus system of claim 2 in which said four lobed body is provided with a plurality of bores for mounting said body on said central pin means in different selected orientations.

8. The apparatus system of claim 1 in which said temporary mounting means comprises: slots in said base means extending inwardly from said peripheral positions toward said central position, block means slidably received in said slots for selected inward or outward positioning therein, and said blocks having vertically-extending holes in which the lower end portions of said peripheral pin means are supportingly insertable.

9. The apparatus system of claim 8 in which said blocks are positionable in said slots with the axes of the said holes inclining inwardly toward said central pin means for supporting said $p$ type model bodies at inclined orientations.

10. An apparatus system for determining those combinations of AO's that are permitted to form MO's in a wide variety of molecules, comprising:
  a. horizontally-extending base means providing on the upper surface thereof a central position and a plurality of peripheral positions arranged generally in a ring around said central position, said peripheral positions including sets of positions representing the corners of plane geometric figures including at least a straight line, an equilateral triangle, and a square;
  b. pin means supportable at said central position to extend vertically upward therefrom for defining a generator axis;
  c. a plurality of movable pin means selectively positionable on said base means at selected ones of said peripheral positions comprising the corners of the one of said geometric figures corresponding to the general shape of the molecule for which the MO's are to be determined and extending upwardly from said base means around said central pin means; kl
  d. means for temporarily mounting said movable pins means at said selected positions;
  e. a plurality of atomic orbital models (AO's) capable of representing $s$ and $p$ types of AO's, said AO models comprising bodies removably mountable on said peripheral pins at selected heights and orientations thereon; and
  f. a plurality of generator models including models capable of representing $s$, $p$, and $d$ types of AO's, said generator models comprising bodies removably mountable on said central pin means at selected heights and orientations thereon; said $s$, $p$, and $d$ type bodies including and being identical in external shape to the $s_1$, $s_2$, $p$, $d_1$ and $d_2$ bodies illustrated in FIG. 8, the portions of said body shown stippled in the representations of FIG. 8 being provided with one kind of matchable indicia and the portions of said body shown white in FIG. 8 being provided with another kind of matchable indicia, whereby sequented substitutions of the different AO bodies on said central pin means, matching and mis-matching alignments thereof with said AO bodies on said peripheral pin means will determine the permitted arrangements of the MO's for selected molecules.

* * * * *

PO-1050
(5/69)

UNITED STATES PATENT OFFICE
CERTIFICATE OF CORRECTION

Patent No.    3,967,388          Dated    July 6, 1976

Inventor(s)    JOHN G. VERKADE and KLAUS RUEDENBERG

It is certified that error appears in the above-identified patent and that said Letters Patent are hereby corrected as shown below:

Column 15, line 24, after "pin means;" please delete "kl" from the end of the line.

Signed and Sealed this

Twenty-first Day of September 1976

[SEAL]

Attest:

RUTH C. MASON
Attesting Officer

C. MARSHALL DANN
Commissioner of Patents and Trademarks